United States Patent [19]
Yi

[11] Patent Number: 5,303,964
[45] Date of Patent: Apr. 19, 1994

[54] PIPE CONNECTOR

[76] Inventor: Lee M. Yi, Yen-Ping N. Rd., Taipei, Taiwan

[21] Appl. No.: 8,294

[22] Filed: Jan. 25, 1993

[51] Int. Cl.⁵ .............................................. F16L 21/06
[52] U.S. Cl. ..................... 285/322; 285/354; 285/382; 285/92
[58] Field of Search ............... 285/322, 323, 354, 386, 285/382, 382.2, 92, 110, 177, 341

[56] References Cited

U.S. PATENT DOCUMENTS

| | | | |
|---|---|---|---|
| 2,585,453 | 2/1952 | Gallagher et al. | 265/341 X |
| 3,425,452 | 2/1969 | Show | 285/362.2 X |
| 3,514,134 | 5/1970 | Shurtleff et al. | 285/382 X |
| 3,640,551 | 2/1972 | Shakesby | 285/386 X |
| 3,895,832 | 7/1975 | Ellis et al. | 285/322 |
| 4,159,134 | 6/1979 | Shemtov | 285/322 |
| 4,362,323 | 12/1982 | Lodder et al. | 285/110 X |
| 4,575,134 | 3/1986 | Sugano | 285/382 X |

FOREIGN PATENT DOCUMENTS 2442392 7/1980 France .................. 285/322

Primary Examiner—Dave W. Arola
Attorney, Agent, or Firm—Alfred Lei

[57] ABSTRACT

This invention relates to a pipe connector comprising: a main connecting pipe formed with an inverted conical surface at the upper edge, a threaded portion at the upper side, and a raised annular portion below the threaded portion; a leak-proof gasket mounted in the inner side of the raised annular portion of the main connecting pipe; a locking nut provided with internal threads and a stop edge having a conical surface opposite to the inverted conical surface of the main connecting pipe; a split ring disposed between the locking nut and the inverted conical surface of the main connecting pipe; and a connecting pipe inserted into the main connecting pipe through the locking nut; whereby two pipes can be easily connected together and no fluid can leak out thereof.

1 Claim, 4 Drawing Sheets

PIPE CONNECTOR

BACKGROUND OF THE INVENTION

It has been found that the prior art pipe connectors on the market are unsatisfactory in use and have a lot of drawbacks. FIG. 1 shows a widely used prior art pipe connector on the market. As illustrated, a pipe A1 is connected with a three-way pipe connector A2 which is provided with a threaded sleeve A21 for engaging with a nut A3. The pipe A1 is designed to be inserted into the sleeve A21 and there is a packing A4 the pipe A1 and the sleeve A21. Further, the pipe A1 is provided with a gasket A5 and a packing A6. However, such connection cannot provide reliable leak-proof capability and is short in service life.

Therefore, it is an object of the present invention to provide an improved pipe connector which may obviate and mitigate the above-mentioned drawbacks.

SUMMARY OF THE INVENTION

This invention relates to an improved pipe connector.

It is the primary object of the present invention to provide a pipe connector which can firmly connect two pipes together.

It is another object of the present invention to provide a pipe connector which can prevent the fluid from leaking out thereof.

It is still another object of the present invention to provide a pipe connector which is easy to operate.

It is still another object of the present invention to provide a pipe connector which is simple in construction.

It is a further object of the present invention to provide a pipe connector which is economic to produce.

The other objects and merits and a fuller understanding of the present invention will be obtained by those having ordinary skill in the art when the following detailed description is read in conjunction with the accompanying drawings wherein like numerals refer to like or similar part.

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
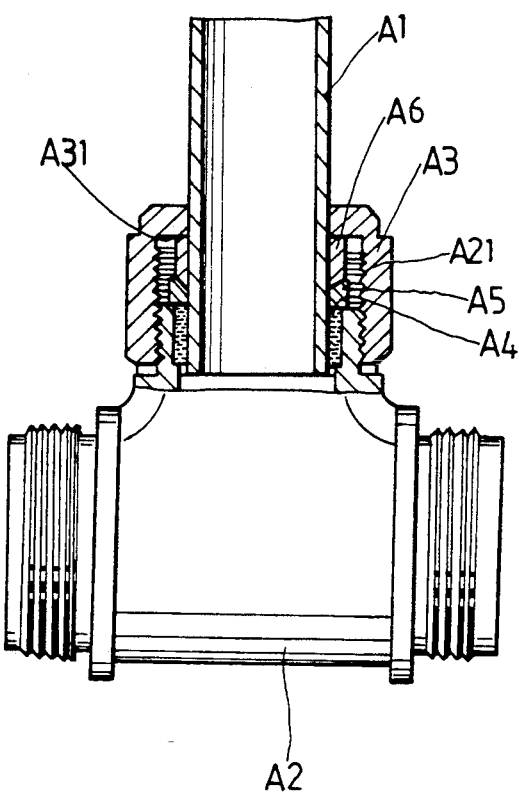
FIG. 1 is a perspective view of a prior art pipe connector.
Figure 2:
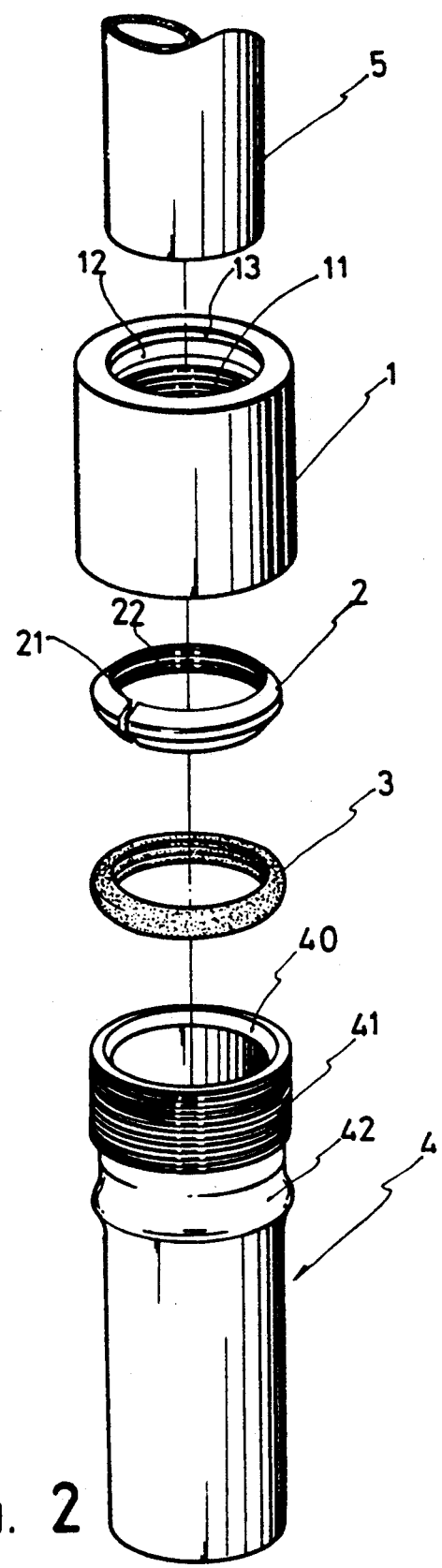
FIG. 2 is an exploded view of the present invention.
Figure 3:
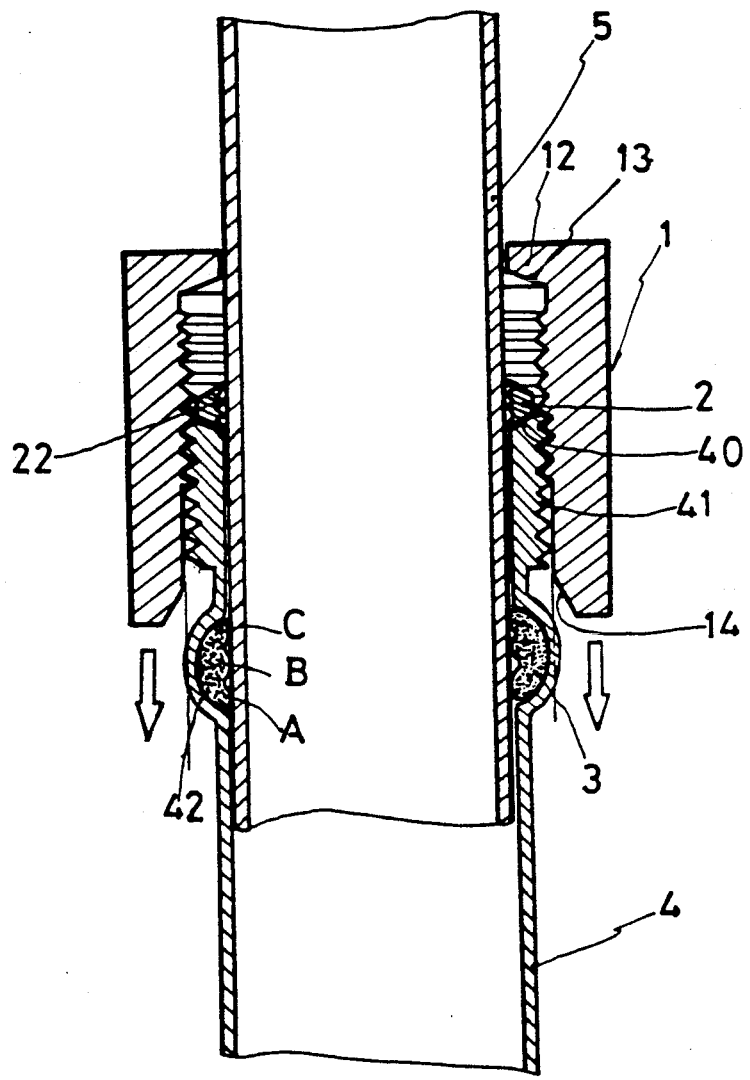
FIGS. 3 and 4 show the working principle of the present invention.

With reference to the drawings and in particular to FIGS. 2 and 3 thereof, the present invention mainly comprises a locking nut 1, a split ring 2, a leak-proof gasket 3, and a main connecting pipe 4. The main connecting pipe 4 is formed with an inverted conical surface 40 at the upper edge, a threaded portion 41 at the upper side, and a raised annular portion 42 below the threaded portion 41. The leak-peak gasket 3 is mounted in the inner side of the annular portion 42, while the split ring 2 is disposed between the locking nut 1 and the inverted conical surface 40 of the main connecting pipe 4 so that the connecting pipe 5 is firmly kept in a fixed position and completely sealed.

As shown in FIG. 3, the locking nut 1 is provided with internal threads 11 and a stop edge 12. The stop edge 12 has a conical surface 13 opposite to the inverted conical surface 40 of the main connecting pipe 4. The split ring 2 is formed with an upper conical edge, a lower conical edge, a slit 21, and a plurality of internal threads 22. When the locking nut 1 is engaged with the main connecting pipe 4, the locking nut 1 will compress the split ring 2 thereby causing the threads 22 of the split ring 2 to grasp the outer surface of the connecting pipe 5 and therefore, firmly joining the main connecting pipe 4 and the connecting pipe 5 together.

Further, the locking nut 1 is provided with a hole 14 having a conical edge. The hole 14 has a diameter slightly smaller than that of the annular portion 42 of the main connecting pipe 4 so that when the locking nut 1 is engaged with the main connecting pipe 4, the hole 14 will compress the annular portion 42 of the main connecting pipe 4 thereby pressing the leak-proof gasket 3 against the outer wall of the connecting pipe 5.

Figure 5:
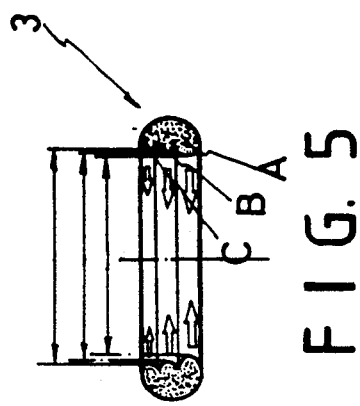
FIG. 5 is an enlarged sectional view of the leak-proof gasket.
Figure 4:
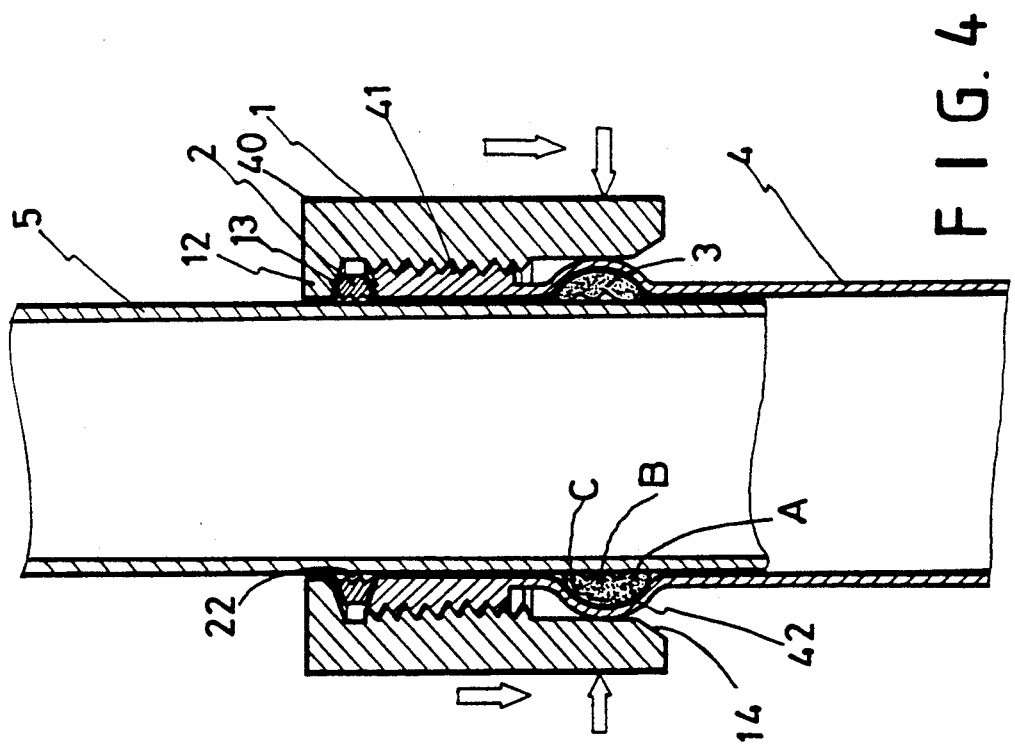

Looking now at FIG. 5, the leak-proof gasket 3 is formed with three annular members with diameters A, B, and C. The diameter A is larger than the diameter B and the diameter B is larger than the diameter C. As the leak-proof gasket 3 is compressed, the three annular members will become three leak-proof members hence enhancing the leak-proof capability of the gasket 3.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A pipe connector comprising: a thin wall main connecting pipe having a thickened upper side with an upper edge, said upper side formed with an inverted conical surface at said upper edge, a threaded portion at said upper side, and a raised annular portion formed in said thin wall extending radially outwardly from said main connecting pipe defining a groove on the interior of the pipe and located below said threaded portion; a leak-proof gasket mounted in said groove and formed with three different inner diameter portion; a locking nut provided with a surface having a smaller diameter than said raised annular portion, internal threads and a stop edge having a conical surface opposite to the inverted conical surface of said main connecting pipe; a split ring disposed between said locking nut and the inverted conical surface of said main connecting pipe and formed with internal threads; and a connecting pipe inserted into said main connecting pipe through said locking nut said locking ring deformed into biting engagement with said connecting pipe by coaction with said inverted conical section and said stop edge and said different diameter portions of said gasket deformed into sealing engagement with said connecting pipe by radial inward deformation of said raised annular portion by said locking nut surface as said locking nut is threaded onto said threaded portion.

* * * * *